Nov. 12, 1957  D. C. MITCHELL ET AL  2,813,041
METHOD OF IMPREGNATING POROUS METAL STRIP
WITH POLYTETRAFLUOROETHYLENE
Filed Aug. 30, 1954
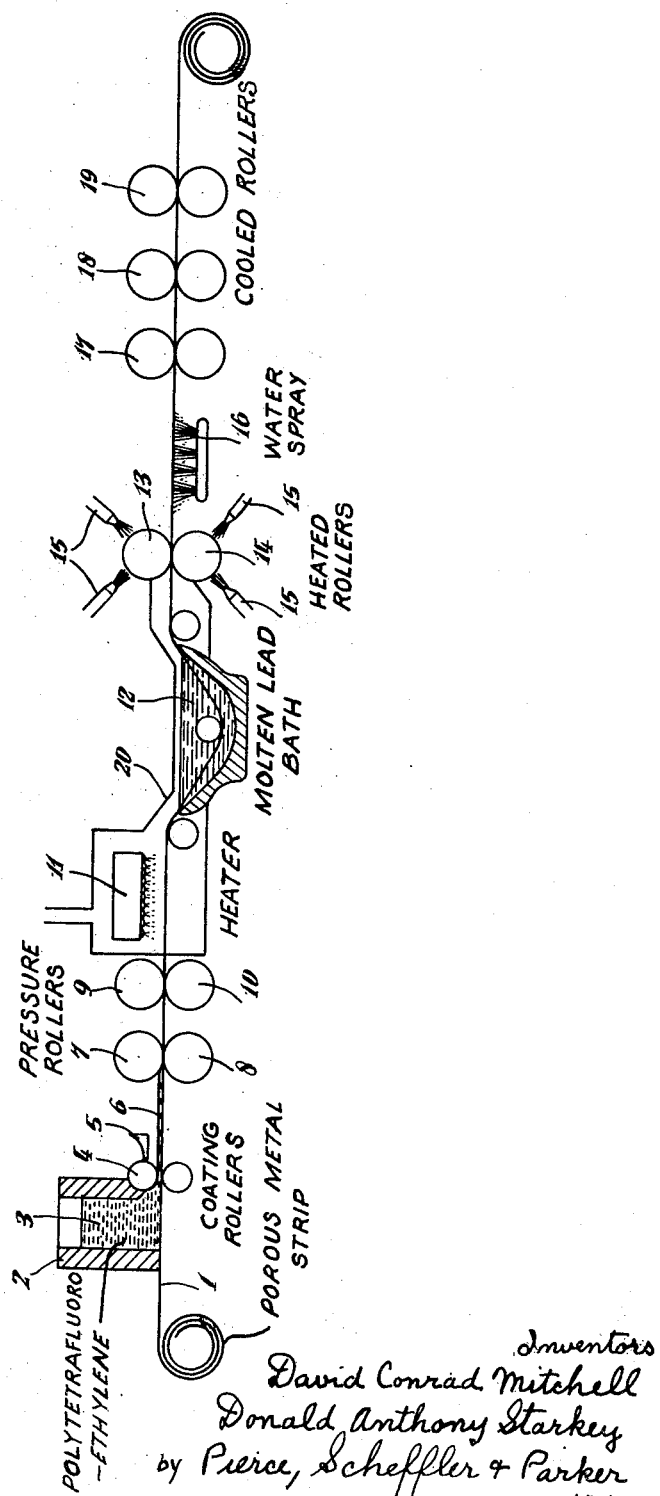
Inventors
David Conrad Mitchell
Donald Anthony Starkey
by Pierce, Scheffler & Parker
attys

United States Patent Office 2,813,041
Patented Nov. 12, 1957

2,813,041

METHOD OF IMPREGNATING POROUS METAL STRIP WITH POLYTETRAFLUOROETHYLENE

David Conrad Mitchell and Donald Anthony Starkey, Alperton, Wembley, England, assignors to The Glacier Metal Company Limited, Alperton, Wembley, England, a British company Application August 30, 1954, Serial No. 452,888

Claims priority, application Great Britain September 9, 1953

20 Claims. (Cl. 117—21)

This invention relates to a method for the production of sheet or strip material for the manufacture of plain bearings, bushes, thrust washers, machine tool slides and the like, and is more particularly concerned with a method adapted for the continuous production of strip material in which at least the surface of a porous metal layer is impregnated with, and if desired covered with, polytetrafluoroethylene.

In prior British Patents Nos. 657,080 and 657,085 it has been proposed to impregnate a porous metal base with polytetrafluoroethylene to obtain a bearing material suitable for dry lubrication. The porous metal base, which is preferably in the form of a porous strip of copper or bronze, preferably with a steel backing and produced by sintering suitably graded metallic powders, affords requisite heat conductivity and mechanical strength while the polytetrafluoroethylene provides very effective antifriction and wear properties.

The pore size of the porous metal base can be closely controlled by using graded powders and may vary, for example, between 10 mu and 400 mu. Heretofore it has been the practice in the production of this composite bearing material to apply the polytetrafluoroethylene in the form of a veneer or of comparatively large granules of e. g. ⅛ inch in diameter. Although polytetrafluoroethylene in this form theoretically could be made to flow at room temperature into the pores of the metal base by applying a sufficiently high degree of pressure, such a method is not practicable because the high degree of pressure necessary would tend to permanently deform the metal and thereby close up the pores before sufficient impregnation had been obtained. It has therefore been necessary to effect the impregnation under pressure at temperatures at which the polytetrafluoroethylene will be rendered sufficiently soft to flow readily into the pores.

It has not been found practicable to produce continuous strip material in this way owing to the difficulty of maintaining the pressure necessary for impregnation for a sufficient period while the material is subjected to the elevated temperature. Thus, it has been necessary to operate intermittently on blanks or batches of blanks.

The present invention has for its object to provide an improved method whereby material of the character referred to may be readily produced in a continuous operation.

According to the present invention, polytetrafluoroethylene is applied to a continuous metal strip having a porous sponge structure in a form consisting of particles of a size which is comparatively small in relation to the pore size of the metal strip and, without first softening the polytetrafluoroethylene by heating, these fine particles are introduced into the pores by the application of pressure insufficient to completely close the pores of the metal strip, and the impregnated material thus formed is subjected to a temperature of 327° C. to 450° C. for a period sufficient to fuse together the particles of polytetrafluoroethylene so as to form a continuous network of the polymer in the porous structure of the metal strip. The polytetrafluoroethylene may be applied in such manner that, in addition to substantially filling the pores of the porous structure, a thin surface layer of polytetrafluoroethylene, e. g. 0.001 inch in thickness, extends over the metal strip.

The particle size of the polytetrafluoroethylene which is suitable for this method of impregnation is dependent on the pore size of the porous material which is to be impregnated. The ratio of pore size of the material to the particle size of the polytetrafluoroethylene should be large, e. g. 10:1. It is, however, preferred that the particle size of the polytetrafluoroethylene should be as small as possible, and in most cases below 1 mu. Excellent results have been obtained with a mean polytetrafluoroethylene particle size of 0.1 mu.

Extremely small particles, for instance, of 0.1 mu size are capable of flowing readily into the comparatively large pores of the metal surface under a small applied load and thus it is possible to introduce the polytetrafluoroethylene into the pores at room temperature and to apply heat at a later stage for fusing the polytetrafluoroethylene particles into a continuous structure.

The shape of the individual polytetrafluoroethylene particles is also an important factor. The particles should be of regular shape, preferably spherical. Particles of an irregular shape can be used, but when the ratio of length to cross-sectional thickness becomes large and the particles are virtually a mass of short fibres, then the impregnation is made more difficult.

The preferred form of the polytetrafluoroethylene is a precipitate, obtained from a dispersion of polytetrafluoroethylene in a liquid carrier, to give a conglomeration of particles of approximately spherical shape and a mean particles size of approximately 0.1 mu.

The polytetrafluoroethylene may be applied in the form of a paste consisting of 70% to 80% solid content of polytetrafluoroethylene, remainder volatilisable liquid.

Alternatively, the polytetrafluoroethylene can be applied in the form of dry powder obtained from a coagulated polytetrafluoroethylene dispersion, or otherwise, in a sufficiently fine form. In order to obtain best results, it is preferred to employ the polytetrafluoroethylene in conjunction with additives which promote the movement of the polytetrafluoroethylene particles into the pores. The additive substance or substances should be capable of being blended with the polytetrafluoroethylene and should be volatilisable or degradable below 325° C. For example, about 20% by volume of toluene can be blended with the polytetrafluoroethylene to give a material suitable for impregnation which is far superior to the dried and unmodified polytetrafluoroethylene powder. Many liquids and solids can be added with advantage to the dried polytetrafluoroethylene and these include xylene, cetane, toluene, hydrocarbon oils, fluorocarbon and fluorochlorocarbon oils, long chain alcohols, such as 1-decanol, etc. The additive serves as a lubricant or vehicle for the particles of polytetrafluoroethylene.

It is preferable to use a liquid additive capable of wetting the polytetrafluoroethylene, and to this end surface active agents may be used to encourage the wetting of the polytetrafluoroethylene by the liquid. For example, if water is used as the liquid additive, then additions to the water of such materials as sodium lauryl sulphate and polyethylene oxide will have beneficial effects.

The proportion of such additives to the dried polytetrafluoroethylene is controlled at the lower end by the amount required to give an effective improvement of the properties of the dried polytetrafluoroethylene, and additions of below 5% by volume have little or no effect. At the upper end the amount to be added is controlled by the quantity of polytetrafluoroethylene which is displaced by the liquid addition. In general, about 20 to 40% by volume can be added to get the maximum amount of polytetrafluoroethylene into the porous metal. More than 40% can be added and will improve the ease of impregnation, but at the same time, the amount of impregnation in terms of solid polytetrafluoroethylene per unit of volume will of course be less.

A proportion of another solid lubricant or lubricants may be added to the polytetrafluoroethylene, the particle size of such solid lubricant addition being less than the pore size of the porous structure of the metal strip and preferably of the same order as the polytetrafluoroethylene particles.

Conveniently, the polytetrafluoroethylene is pressed into the pores by passing the metal strip with a layer of the polytetrafluoroethylene applied thereon between rolls. Two or more roll stages may be employed for this purpose, the top roll of at least the first stage preferably being knurled.

Fusion of the particles of polytetrafluoroethylene may be effected by passing the impregnated metal strip through a molten lead bath. The impregnated metal strip may be pre-heated to about 200° C. by means such as a radiant gas heater prior to passing through the lead bath. On emerging from the lead bath the impregnated metal strip may be passed between rolls heated to about 380° C. After the fusion operation, the impregnated metal strip may be cooled by water sprays. Final compacting and thicknessing of the strip material may be effected by rolling.

The metal strip preferably comprises a layer of porous bronze or copper sintered on to a copper-plated steel backing. A high degree of porosity, e. g. 35 to 60% is preferred.

The invention is hereinafter described, by way of example, with reference to the accompanying diagrammatic drawing which is a part sectional elevation illustrating a preferred method and apparatus for the production of continuous strip material in accordance with the invention.

In carrying the invention into effect according to one embodiment, and with reference to the accompanying diagrammatic drawing, a porous metal strip 1 is passed beneath a hopper 2 containing polytetrafluoroethylene 3 which is spread on to the strip to a suitable thickness, e. g. 0.011 inch by means of a roller die 4 at the outlet from the hopper 2, the roller 4 rotating anti-clockwise and a scraper 5 being provided for removing any polytetrafluoroethylene adhering to the roller die 4. The strip 1 carrying a layer 6 of polytetrafluoroethylene then passes between a first pair of pressure rollers 7, 8.

The porous metal strip may be of any suitable kind. A preferred material is copper-plated steel with a layer of porous bronze or copper sintered on to it. For example, a bi-metal strip may be prepared by spreading on to a copper-plated steel backing having a thickness, for example, of 0.045 inch, 89/11 copper-tin alloy powder of a uniform particle size of between 150 to 200 mesh and sintering in the conventional manner to produce a bi-metal strip having a bronze layer of about 0.015 inch in thickness and a high porosity, e. g. 45% by volume. The sintered material should be made preferably from a spherical metal powder which has been graded to give particles of a reasonably uniform diameter. Strip produced from bronze powder which has been graded such that all will pass through a 150 mesh B. S. sieve and none through a 200 mesh B. S. sieve is a suitable example. The larger the particle size that is used, the easier impregnation will be, but the coarser the porous structure produced. In practice it is necessary to strike a balance between the required degree of impregnation and the coarseness of the structure which can be tolerated. Graded powder has the advantage that high porosity will be obtained when it is sintered and the higher the porosity the greater the quantity of polytetrafluoroethylene that can be impregnated into the metal matrix and thereby form a store of polytetrafluoroethylene available to maintain an effective lubricating surface on the bearing.

The thickness of the porous material to be impregnated should preferably be controlled so that impregnation to the full depth of the material is obtained. Thicknesses of up to about 0.25 inch are suitable but a layer of between 0.010 inch and 0.020 inch is preferred in the case of bronze powder. For sintered stainless steel, thicknesses of less than 0.100 inch are preferred.

The strip should be free of dirt, water and excessive oxide coatings; the porosity should be interconnected and fully available to the bearing surface and the metal powder well bonded to the steel backing, if a backing is used.

In order to prevent backwards and sideways flow of the polytetrafluoroethylene, the surface of the top roll 7 is roughened by any suitable means, such as knurling or etching. The roughness should not be uni-directional and it should be of such a nature that the polytetrafluoroethylene is held in contact with the porous metal during rolling and does not flow laterally over the surface pores. Diamond-shaped knurling or heavy acid etching is suitable. The strip passes then between a second pair of rolls 9, 10 which are smooth. The pairs of rolls 7, 8 and 9, 10 are set to the thickness of the bi-metal strip with no allowance for the layer 6 of polytetrafluoroethylene. The strip then passes under a radiant gas heater 11 by which it is subjected to a temperature of about 200° C. for about 30 seconds to drive off any excess liquid, and the strip then passes through a molten lead bath 12 maintained at about 380° C., the strip being immersed in the molten lead for about 60 seconds.

The fusing step for forming a continuous network of the polytetrafluoroethylene in the porous matrix, and, if desired, a thin surface layer of polytetrafluoroethylene on the strip, may be otherwise effected, for example, by the use of any conventional heating means, such as a muffle furnace, radiant gas or electric heating, electrical resistance or inductance heating of the strip, or the use of a heated salt bath. In general, the fusing operation is complete when all the polytetrafluoroethylene has been subjected to a temperature in excess of 327° C., but it is preferred to use a temperature between 330° C. and 450° C. applied for a suitable period of between 5 seconds and 1 hour depending on the thickness of the porous material to be impregnated and the method used for the heating.

During the fusing stage it may be desirable to apply comparatively light pressure on the strip, for example, 30 lbs. per square inch, for instance, by the use of a series of rollers in the furnace or by applying plates of suitable weight on to the strip or by conveying the strip under tension over a convex surface with the polytetrafluoroethylene coating in pressure contact with said surface, the object being to prevent surface flaws which may arise from eruptions of entrapped gas or liquid. Towards the end of the fusing operation it may be desirable to roll the material by the use of heated rollers while the polytetrafluoroethylene is still in a plastic state in order to remove surface flaws and to size the material. For this purpose, on emerging from the lead bath 12 the strip passes between rolls 13, 14 heated as by means of gas flames 15 to a temperature of about 380° C., these rolls being as close as possible to the lead bath and also set to the thickness of the bi-metal strip with no allowance for the polytetrafluoroethylene, and both rolls having a smooth surface. The strip is then cooled as by means of water sprays 16 and then passes between three sets of cooled rolls 17, 18, 19 all set to the thickness of the bi-metal strip minus 0.003 inch so as to ensure as far as possible full compaction and uniform thickness of the composite strip and having a smooth surface finish so that the material is ready for the production of plain bearings, such as half liners, bushes, thrust washers, machine slides or the like.

The heater 11 and bath 12 may be enclosed in a casing 20 in which a non-oxidizing atmosphere is maintained. Cooling by the water sprays 16 gives a tough surface layer of polytetrafluoroethylene due to the fact that the temperature of the strip is rapidly reduced through the transition point of 327° C. This cooling step can be effected by plunging the strip into water. Alternatively, the strip can be passed through cooling rolls which at the same time compact the strip to a desired thickness. If a hard polytetrafluoroethylene surface layer is required, the material should be cooled slowly through the transition point. For this purpose it may be desirable to pass the strip through a furnace with, if necessary, a non-oxidizing atmosphere so that the temperature of the strip is gradually reduced. Alternatively, the strip may be allowed to cool slowly in a non-oxidizing atmosphere until it has reached a temperature below 327° C. say, 300° C., from which stage it can be rapidly brought down to room temperature by quenching or spraying with water.

The pairs of rolls referred to above can either be set to a predetermined gap or to a predetermined pressure. When rolling with a predetermined gap is used, then the setting of the rolls should be such that the gap between them is equivalent to the thickness of the bi-metal strip with a small tolerance on either side, say, 0.001 inch to 0.002 inch. No allowance should be made for the polytetrafluoroethylene layer which is to be pressed into the pores. If greater gaps are used, then impregnation will be incomplete. If smaller gaps are used, then instead of all the polytetrafluoroethylene being forced into the pores, the metal will be compacted excessively and the polytetrafluoroethylene cannot be as fully impregnated as required.

When rolling with a predetermined pressure, the load to be applied is determined by the mechanical properties of the material which is being impregnated and the size of the rolls which are being used. The pressure is chosen in such a way that any permanent deformation of the porous metal strip that takes place is only slight. When using a porous bronze layer of between 0.010 inch to 0.020 inch thickness on a steel backing, a permanent reduction in thickness of about 0.001 inch or less, is satisfactory. If the porous layer is thicker, then higher deformation can be tolerated. Other things being equal, larger diameter rolls will take a higher pressure than small diameter rolls.

Whilst the strip is being impregnated by passing through the rolls, it should not be under high tension.

Large diameter rolls, e. g. 18 inches in diameter, are advantageous in view of the fact that polytetrafluoroethylene is liable to flow backwards very easily. Alternatively, the composite strip may be rolled between superimposed strips or sheets or with at least one strip or sheet superimposed on the surface of the polytetrafluoroethylene.

It has been found that where successive rolling steps for impregnation are beneficial, the majority of the impregnation generally is effected by the first pair of rolls 7, 8. Some additional impregnation takes place during passage between the second pair of rolls 9, 10 but only a slight increase in penetration would be obtained by further rolling steps. Only the first top roll 7 requires to be knurled or roughened although subsequent top rolls can be knurled or roughened if desired, provided that the final top roll has a smooth surface in order to give the product a good surface appearance.

If it is desired to obtain increased penetration with each subsequent rolling step, the gap between successive pairs of rolls may be reduced, or the roll pressure of each successive pair of rolls may be increased. The use of several pairs of rolls has the additional advantage that if the surface layer of the polytetrafluoroethylene is excessive, the subsequent rolls can be used to reduce the thickness of the surface layer.

Sometimes it may be necessary to remove the surface layer of polytetrafluoroethylene after a given series of rolling operations, as this layer tends to become fully compacted and of no further use for impregnation. If the layer is removed, then additional polytetrafluoroethylene can be applied to the surface as described above and a further number of rolling operations may need to be carried out. The surface layer may be removed by a machining operation and then a further layer of the polytetrafluoroethylene powder applied, the steps of applying the powder, compacting and removing surplus from the surface layer being repeated if required. After the rolling, part of the polytetrafluoroethylene surface may be removed in order to obtain strip of the required thickness. When the strip has been fully impregnated, the surface layer may be too thick, and prior to fusion it may be reduced by any suitable method such as knifing, milling, brushing, etc. in order to obtain strip of the correct thickness.

Preferably the polytetrafluoroethylene 3 in the hopper 2 is in the form of a paste which may be prepared in the following manner: To a dispersion of polytetrafluoroethylene in water, such as obtained directly by the known method of polymerising polytetrafluoroethylene, and generally consisting of spherical particles dispersed in water with wetting agents, and of a mean size of about 0.1 mu, additions of suitable materials are made. It has been found by experience that the best results are obtained when organic liquids, such as hydrocarbon oils, toluene and cetane are added, and if need be, certain surface active agents, e. g. Lissapol and Empicol (registered trademarks).

Lissapol and Empicol are both surface active agents and they help to keep the liquids present in the paste evenly distributed. They are of the type of alkyl aryl polyether alcohol and sodium lauryl sulphate respectively, and other wetting agents of similar type will be found equally suitable.

A mixture can be made, for example, to contain 2% Lissapol, 5% Empicol and 20% toluene, all based on the weight of the solid polytetrafluoroethylene present in the dispersion. The polytetrafluoroethylene can be in dilute or concentrated dispersions, e. g. 2% to 60% of polytetrafluoroethylene dispersed in water. However, dispersions with high concentrations are preferred as these do not require the removal of so much excess liquid.

From this mixture the polytetrafluoroethylene can be precipitated by the addition of an ionic salt, such as aluminum chloride, to give a thick slurry containing polytetrafluoroethylene, water, toluene and the addition agents. The excess liquid is then decanted and the resulting paste dried until it contains about 75% polytetrafluoroethylene and 25% other materials. The final liquid content of the polytetrafluoroethylene paste used for the impregnation has an important effect on the final quantity of polytetrafluoroethylene which will be contained in the porous metal. The best results have been achieved with a solid content of between 70–80% by volume, the remainder being volatilisable liquids, e. g. water and toluene.

In a specific embodiment, an aqueous dispersion of polytetrafluoroethylene containing 55% by weight of polytetrafluoroethylene is used, and to every 100 gms. of this dispersion is added 0.69 gm. of Lissapol, 3.1 gms. of Empicol, and 11.8 gms. of toluene. After mixing, 0.5 gm. of aluminum chloride crystals are added to precipitate the polytetrafluoroethylene. Excess liquid is decanted and the mixture dried in an oven at 80° C. until it contains approximately 75% by weight of polytetrafluoroethylene and is in the form of a paste suitable for impregnation of the porous strip in the manner described.

The addition of materials to the polytetrafluoroethylene dispersion can be made at one or all of the stages prior to use for impregnation. It can be made, as described above, directly to the virgin dispersion or, alternatively, the polytetrafluoroethylene can first be precipitated and then suitable additions can be made, or the polytetrafluoroethylene can be precipitated, the excess liquid decanted and then additions made to the resulting slurry.

For example, a dispersion containing 5% by weight of polytetrafluoroethylene and 1.25% of Lissapol can be precipitated by the addition of ferric chloride to give a flocculent precipitate. After decanting, 5% by weight of Empicol is added and 30% by weight of toluene, all based on the weight of polytetrafluoroethylene present. The whole is blended to give a further slurry which is heated to remove excess liquid until a paste containing between 70–80% by weight of polytetrafluoroethylene is obtained.

The precipitation of the polytetrafluoroethylene from the dispersion can be made by several methods, such as boiling, freezing, violent stirring, centrifuging, addition of ionic salts, additions of organic liquids which wet the polytetrafluoroethylene preferentially to the water, e. g. acetone, additions of acids or alkalies, e. g. hydrochloric acid, sodium hydroxide, etc. or additions of any materials which react chemically with the dispersing and wetting agents and so remove the polytetrafluoroethylene from suspension. Of all these materials mentioned, ionic salts are preferred and their use can be carried out most economically. Salts such as aluminum chloride are cheap and very efficient as coagulants.

It is possible to add solid lubricants, such as molybdenum disulphide, graphite, boron nitride, tungsten sulphide, etc. at any stage to the polytetrafluoroethylene either when dispersed or after coagulation. The particle size of such solid lubricant additions is important and materials of colloidal dimensions are preferred. It is essential that the particles be less than the pore size of the porous structure of the metal strip and preferably of the same order of size as the polytetrafluoroethylene particles, i. e. preferably below 1 mu. The solid lubricant addition may vary within a wide range e. g. from 1% to 50% of the weight of the polytetrafluoroethylene.

Polytetrafluoroethylene paste may be applied to the strip in any other suitable manner, for example, by extruding or painting. Alternatively, polytetrafluoroethylene in the form of dry powder may be applied by spraying or in any other suitable manner, preferably in conjunction with additives, such as before referred to.

A further possibility is to pass a strip through a bath containing polytetrafluoroethylene in dispersion in water optionally with suitable additions, the strip being connected as anode in an electrical circuit including the bath, so that the polytetrafluoroethylene particles will be attracted to the strip. By suitably selecting current density and time of passage through the bath, a suitable thickness of polytetrafluoroethylene can be built up. A further method is to electrostatically charge the polytetrafluoroethylene particles so as to be attracted to the earthed strip which may be caused to traverse over loose powder in a container. Alternatively, the powder may be pre-formed into a cake and rubbed over the strip.

Pressing of the polytetrafluoroethylene powder into the pores can be effected alternatively by a reciprocatory compacting device, or by an endless caterpillar track or endless band adapted to maintain pressure over a suitable length of strip.

The endless track or band in contact with the polytetrafluoroethylene can be knurled on the side facing the polytetrafluoroethylene.

It will be understood that the invention is not limited to the particular embodiments hereinbefore described. For example, the application of the polytetrafluoroethylene powder, the introduction of the powder into the pores, and the sintering or fusing and finishing operation may be effected in any other suitable manner.

What is claimed is:

1. A method for the production of continuous strip material adapted for the manufacture of plain bearings which comprises depositing a coating of polytetrafluoroethylene in finely divided form on a continuous metal strip having a porous sponge structure, the particle size of polytetrafluoroethylene being not more than one tenth of the pore size of the sponge structure, pressing the fine particles into the pores by the application of pressure insufficient to completely close the pores of the metal strip, and heating the pressed strip to a temperature of 327° C. to 450° C. for a period sufficient to fuse together the particles of polytetrafluoroethylene so as to form a continuous network thereof in the porous structure of the metal strip.

2. A method according to claim 1, wherein the quantity of polytetrafluoroethylene applied is in excess of the quantity required to fill the pores of the porous structure, whereby a thin surface layer of polytetrafluoroethylene extends over the surface of the metal strip.

3. A method according to claim 1, wherein the particle size of the polytetrafluoroethylene is below 1 mu.

4. A method according to claim 1 wherein the mean particle size of the polytetrafluoroethylene is about 0.1 mu.

5. A method according to claim 1 wherein the polytetrafluoroethylene particles are of spherical shape.

6. A method according to claim 1 wherein the polytetrafluoroethylene is in the form of a precipitate obtained from a dispersion thereof in a liquid.

7. A method according to claim 1, wherein the polytetrafluoroethylene is applied in the form of a paste consisting of 70 to 80% of polytetrafluoroethylene and the remainder is volatilisable liquid.

8. A method according to claim 1, wherein the polytetrafluoroethylene is applied in the form of dry powder.

9. A method according to claim 1, wherein a substance which can be blended with the polytetrafluoroethylene and which is volatilisable or degradable below 325° C., is mixed with the polytetrafluoroethylene.

10. A method according to claim 9, wherein the substance is a liquid and in which a surface active agent is mixed with polytetrafluoroethylene.

11. A method according to claim 1, wherein a solid lubricant is added to and mixed with the polytetrafluoroethylene, the particle size of the solid lubricant being less than the pore size of the porous structure of the metal strip.

12. A method according to claim 1, wherein the polytetrafluoroethylene is pressed into the pores of the metal strip by passing the metal strip with the coating of the polytetrafluoroethylene thereon between rolls.

13. A method according to claim 12, wherein a roll which bears against said coating has a roughened surface.

14. A method according to claim 1, wherein the coated and pressed strip is passed through a molten lead bath.

15. A method according to claim 14, wherein the coated and pressed metal strip is pre-heated to about 200° C. before passing through the lead bath.

16. A method according to claim 14, wherein, on emerging from the lead bath the metal strip is passed between rolls heated to about 380° C.

17. A method according to claim 14, wherein, after passing through the lead bath the metal strip is cooled by water sprays.

18. A method according to claim 14, wherein final compacting and thicknessing of the strip material is effected by rolling.

19. A method according to claim 1 wherein the metal strip comprises a layer of porous bronze sintered on to a copper-plated steel backing.

20. A method according to claim 19, wherein the porous bronze has a porosity of 35 to 60%.

References Cited in the file of this patent

UNITED STATES PATENTS

| | | |
|---|---|---|
| 1,999,259 | Rozema | Apr. 30, 1935 |
| 2,340,452 | Child | Feb. 1, 1944 |
| 2,396,629 | Alfthan | Mar. 19, 1946 |
| 2,715,617 | White | Aug. 16, 1955 |

FOREIGN PATENTS

| | | |
|---|---|---|
| 657,085 | Great Britain | Sept. 21, 1951 |
| 690,031 | Great Britain | Apr. 8, 1953 |
| 707,065 | Great Britain | Apr. 14, 1954 |